United States Patent Office 3,208,987
Patented Sept. 28, 1965

3,208,987
REMOVAL OF CATALYST RESIDUES FROM POLYPROPYLENE
Robert J. Reid, Canal Fulton, Wendell R. Conard, Kent, and Joseph H. Tazewell, Akron, Ohio, assignors to The Firestone Tire & Rubber Company, Akron, Ohio, a corporation of Ohio
No Drawing. Filed May 17, 1961, Ser. No. 110,666
19 Claims. (Cl. 260—93.7)

This invention relates to the production of polypropylene substantially free of catalyst residues. More particularly the invention relates to the removal from solid propylene polymers of coordination catalyst residues.

Propylene is commercially polymerized in the presence of metal-compound-containing "coordination" catalysts, residues from which contaminate the crude polymer. Numerous processes have been developed for the recovery of polypropylene substantially uncontaminated with such catalyst residues. Representative procedures are described in U.S. Patents 2,921,057; 2,028,815 and British patent specifications 808,162; 827,804; 831,347; 831,989 and 839,378.

The prior art processes exemplified by the aforementioned disclosures are attended by various disadvantages. In some instances wherein an alcohol is employed to form the soluble alcoholate of the metal component of the catalyst, a halogen acid is released which causes substantial corrosion of equipment employed and the discoloration of the polymer product. It has been suggested to employ a basic material, such as sodium or ammonium hydroxide in combination with an alcohol to neutralize the halogen acid released. Such expedients do not alone accomplish substantially complete removal of the catalyst residue from the polymer. Metal-ion-containing materials which remain in the polypropylene subsequent to such procedures cause the polymers to be of poor color and occasion difficulty in subsequent compounding and processing operations. Analogous disadvantages attend other known procedures for the removal of coordination catalyst residues from polypropylene.

It is accordingly a primary object of the invention to provide a commercially feasible process effective to substantially completely separate coordination catalyst residues from polypropylene.

It is a further object of the invention to provide polypropylene of excellent color, low ash and chlorine content, and good physical properties.

It is an additional object of the invention to provide a polypropylene purification process which is essentially non-corrosive to conventional equipment.

In accordance with this invention solid polypropylene containing the residues of a coordination catalyst is slurried in methanol, contacted with anhydrous ammonia, separated from the resultant ammonia-containing methanol, contacted with a mixture of methanol and an ethanolamine, and separated from said mixture.

In a more specific embodiment, the invention comprises polymerizing propylene, in an inert solvent, in the presence of a coordination catalyst to produce in said solvent a slurry of solid polypropylene containing residues of said catalyst; forming a mixture of said slurry with anhydrous ammonia and methanol; separating said solid polypropylene from said mixture; contacting said separated solid polypropylene with methanol and an ethanolamine selected from the group consisting of monoethanolamine, diethanolamine, triethanolamine and mixtures thereof; and separating the solid polypropylene from the methanol and ethanolamine mixture.

Anhydrous ammonia is utilized in an amount requisite to provide a pH of at least seven, preferably at least about eight in the solid-polypropylene-containing methanol slurry. A pH range of from about eight to about twelve is appropriate.

The methanol, in both the initial slurrying step and in the subsequent contacting step in conjunction with an ethanolamine, is employed in an amount in excess of that required to convert the metallic materials present to alcoholates. In general it is appropriate to utilize in both steps of the process methanol in an amount requisite to provide from about 1.5 to about seven parts by weight thereof per part by weight of said polypropylene.

The ethanolamine is employed in an amount at least requisite to neutralize all acidic materials such as hydrogen halides which are released by the methanol in conjunction with which the ethanolamine is employed. In general the ethanolamine is utilized in an amount requisite to provide from about 0.05 to about four parts by weight thereof per one hundred parts by weight of polypropylene.

The invention contemplates all of the various ethanolamines including specifically monoethanolamine, diethanolamine and triethanolamine. By virtue of the stoichiometry involved relatively less monoethanolamine is required than diethanolamine or triethanolamine. Likewise less diethanolamine is required than triethanolamine. Preferably when monoethanolamine is utilized, there is employed from about 0.1 to about four parts by weight thereof per one hundred parts by weight of polypropylene. When diethanolamine is employed, from about 0.15 to about four parts by weight thereof per one hundred parts of polypropylene is appropriate. When triethanolamine is utilized it is suitable to employ from about 0.3 to about four parts by weight thereof per one hundred parts by weight of polypropylene. The amount of ethanolamine used is dependent upon the quantity of acid generating catalyst present in the polymerization slurry and the extent of the ammonia-methanol treatment.

In a preferred practice of the invention the anhydrous ammonia is bubbled through a slurry of solid polypropylene in methanol until a pH of from about eight to about twelve is established in the system. In general such treatment is completed within a time period of from about five to about thirty minutes. The ammonia treatment can be accomplished at any appropriate temperature. Temperatures of from about 20° C. to about 50° C. are suitable, although higher or lower temperatures can be utilized.

The ammonia-methanol treated polypropylene can be contacted with the mixture of methanol and ethanolamine at any desired temperature below the fusion point of the propylene polymer, for such time as is required to substantially free the polypropylene of coordination catalyst residues. In the preferred practice of the invention the treatment with the mixture of methanol and ethanolamine is carried out at a temperature of at least about 40° C. but below the fusion point of the polymer for a time period of at least about five minutes, preferably from about one to about four hours. It will be apparent that as the temperature is increased the time may be decreased. Also in the preferred practice of the invention the propylene polymer is washed with methanol subsequent to the treatment with the mixture of methanol and ethanolamine and thereafter compounded in conventional manner with stabilizers known to the art.

The particular coordination catalyst utilized forms no essential part of the invention, which contemplates all such catalysts. The art is familiar with the coordination catalysts useful for the polymerization of propylene; hence an exhaust delineation is unnecessary. In general, such catalysts are formed by mixing a compound, preferably a halide, of a metal of group [1] IVB, VB, VIB, VIIB or VIII with a reducing agent which generally is a metal or an organometallic compound. Representative reducing agents include alkyl aluminums such as triethylaluminum and diethylaluminum chloride; alkali metals, such as sodium, lithium and potassium; alkali metal hydrides, such as lithium hydride, sodium hydride, lithium aluminum hydride, and the like; alkali metal alkyls such as butyllithium; alkali metal derivatives of aryl compounds such as phenyllithium, and similar materials. Representative coordination catalysts embraced by the invention are disclosed in U.S. Patents 2,928,817; 2,921,057; and 2,919,264; in British specifications 841,290; 840,314; 828,791; 828,690; 828,320; 828,198; 820,263; 819,867; 810,823; 799,823; and 799,392; and in South African specification 489/59. An important subgroup of coordination catalysts is formed by mixing a compound, preferably a halide (such as a chloride, bromide or iodide) of an element of groups IVB to VIB inclusive of the periodic [1] table including thorium and uranium with an alkali metal, an alkali metal hydride, an alkali metal aluminum hydride, or an organometallic compound of an alkali metal, an alkaline earth metal, aluminum, magnesium or zinc.

A more generally utilized category of coordination catalysts is formed by mxiing an aluminum compound, selected from the group consisting of the alkylaluminum mono- and di-chlorides and bromides having from about two to about four carbon atoms in the alkyl group and the trialkylaluminums having from about two to about four carbon atoms in the alkyl group, with a salt, preferably a halide such as chloride, bromide or iodide of titanium, zirconium, hafnium, thorium, uranium, vanadium, columbium, tantalum, chromium, molybdenum and tungsten.

Diethylaluminum chloride, ethylaluminum dichloride and triethylaluminum mixtures with titanium tetrachloride and titanium trichloride are commercially utilized. A commercial product of the Stauffer Chemical Company prepared by the aluminum reduction of titanium tetrachloride and activated by comminution is an effective coordination catalyst component.

*Example I*

The "coordination" catalyst employed in this example was diethylaluminum chloride and Stauffer aluminum-reduced and activated titanium tetrachloride referred to above. Each of the catalyst components was contained in sealed bottles as 1.0 molar solutions or suspensions. Prior to introducing the catalyst component, the polymerization bottles were completely dried, flushed with nitrogen and charged with acid washed hexane which had been distilled under nitrogen from calcium hydride and triisobutylaluminum. The catalyst components were withdrawn from the sealed bottles by inserting a hypodermic syringe through a self-sealing rubber liner of the cap.

The polymer was prepared in dry 24 ounce bottles which had been flushed for two to three minutes with lamp grade nitrogen. The bottles were charged with 400 ml. of acid washed hexane which previously had been distilled under nitrogen from calcium hydride and triisobutylaluminum. The bottle was flushed again with nitrogen and capped with crown caps having a hole in the center and lined with self-sealing rubber liners. The bottles were cooled in ice water for thirty minutes to make the propylene more easily charged due to increased solubility. The bottles were then charged with 25 grams of propylene from a tank with the aid of a heavy rubber hose and a hypodermic syringe needle. The rubber liner of the bottle cap was penetrated with the hypodermic syringe and propylene added to the desired weight. The bottles were then allowed to warm to room temperature. The diethyl aluminum chloride was withdrawn from its sealed container by means of a hypodermic syringe and added in an amount of 0.596 gram (catalyst weight) to the bottle containing the propylene/hexane mixture. The aluminum-reduced-activated titanium tetrachloride was similarly added to the sealed polypropylene/hexane bottle in an amount of 0.404 gram (catalyst weight). The polymerization was carried out at room temperature with continued agitation. The course of the polymerization was followed with a pressure gauge fitted to a hypodermic needle.

After polymerization was substantially complete, as indicated by the pressure guage the bottle was vented. The polymer slurry was then treated with 400 ml. of 1% ammoniacal methanol in a Waring Blendor operated at high speed. A nitrogen atmosphere was maintained above the slurry during transfer and coagulation. The polymer was separated from the solution by filtration and washed for two hours at 90° C. in 400 ml. of methanol containing 0.03% of triethanolamine. While washing the polymer was again maintained under an atmosphere of nitrogen. The polymer was again separated from the slurry and washed with 100 ml. of the methanol. The filter cake was then saturated with a solution containing 0.2% of an organic tin mercaptide stabilizer (dibutyltin dilauryl mercaptide) in methanol. After allowing the saturated filter cake to stand for about ten minutes, the stabilizer solution was pulled through, and the polymer was dried.

For comparison purposes, the same procedure was carried out employing 1.0% of triethanolamine in the methanol coagulation step and 0.15% of triethanolamine in the methanol washing. To determine the corrosiveness of the washing liquor in each case pieces of shim steel 11" x 0.5" x 0.003" were placed in the triethanolamine/methanol wash liquid from each procedure and allowed to remain 70 hours at 90° C. The loss in weight in milligrams was determined in each case. The corrosion loss in the liquor employing ammonia in the coagulation step was less than 1/10 of the corrosion loss in the liquor from the second procedure, in which no ammonia was used.

The same procedure was again carried out employing methanol only for the coagulation and wash liquid. The polymer produced in accordance with the present invention had a lower ash content and less discoloration than the polymer prepared by the use of methanol only as the coagulation and wash liquid.

Preferably treatment of the polymer after polymerization is effected under substantially anhydrous and anaerobic ocnditions.

We claim:

1. A process for the production of solid polypropylene which comprises polymerizing propylene in an inert solvent in the presence of a coordination catalyst comprising a compound of a metal selected from groups IV–B, V–B, VI–B, VII–B and VIII of the Periodic Table and a reducing agent to produce in said solvent a slurry of solid-polypropylene-containing residues of said catalyst; forming a mixture of said slurry with anhydrous ammonia and methanol; separating the solid polypropylene from said mixture; contacting said separated solid polypropylene with methanol and an ethanolamine selected from the group consisting of monoethanolamine, diethanolamine, triethanolamine and mixtures thereof; and separating the solid polypropylene from the methanol and triethanolamine mixture.

2. The process of claim 1 wherein said ammonia is utilized in an amount requisite to establish a pH of at least seven in said mixture.

3. The process of claim 1 wherein said ammonia is utilized in an amount requisite to establish a pH of at least about eight in said mixture.

4. The process of claim 1 wherein said ammonia is utilized in an amount requisite to establish a pH of from about eight to about twelve in said mixture.

5. The process of claim 1 wherein said ethanolamine is utilized in an amount requisite to provide from about ---
[1] Pages 56 and 57, Lange's Handbook of Chemistry, ninth edition, 1956.

0.05 to about four parts by weight thereof per one hundred parts by weight of said polypropylene.

6. The process of claim 1 wherein said solid polypropylene is maintained in contact with said methanol and said ethanolamine for a time sufficient to render the catalyst residues soluble.

7. The process of claim 1 wherein said solid polypropylene is maintained in contact with said methanol and ethanolamine at a temperature of from about 40° C. to about 150° C. for from about five minutes to about three hours.

8. A process for the production of solid polypropylene which comprises polymerizing propylene in an inert solvent in the presence of a coordination catalyst comprising a compound of a metal selected from groups IV–B, V–B, VI–B, VII–B and VIII of the Periodic Table and a reducing agent to produce in said solvent a slurry of solid polypropylene containing residues of said catalyst; forming a mixture of said slurry with anhydrous ammonia and methanol, said anhydrous ammonia being utilized in an amount requisite to raise the pH of said mixture to at least about eight, said methanol being utilized in an amount from about 1.5 to about seven parts by weight thereof per part by weight of said polypropylene, separating said polypropylene from said mixture, contacting said separated polypropylene with methanol and an ethanolamine selected from the group consisting of monoethanolamine, diethanolamine and triethanolamine, said methanol being utilized in an amount from about 1.5 to about seven parts by weight thereof per part by weight of said polypropylene, said ethanolamine being utilized in an amount from about 0.05 to about four parts by weight thereof per one hundred parts by weight of said polypropylene.

9. The process of claim 8 wherein said polypropylene is contacted with said methanol and ethanolamine for at least about five minutes at a temperature of at least about 40° C. but below the fusion temperature of said polypropylene.

10. The process of claim 9 wherein said ethanolamine is monoethanolamine utilized in an amout requisite to provide at least about 0.1 part by weight thereof per one hundred parts by weight of said polypropylene.

11. The process of claim 9 wherein said ethanolamine is diethanolamine utilized in an amount requisite to provide at least about 0.15 part by weight thereof per one hundred parts by weight of said polypropylene.

12. The process of claim 9 wherein said ethanolamine is triethanolamine utilized in an amount requisite to provide at least about 0.3 part by weight thereof per one hundred parts by weight of said polypropylene.

13. The process of claim 12 wherein said polypropylene is separated from said methanol and ethanolamine and thereafter washed with methanol.

14. The process of claim 12 wherein said catalyst is formed by mixing ethyl aluminum dichloride and aluminum-reduced-and-activated titanium tetrachloride.

15. The process of claim 8 wherein said polypropylene is separated from said methanol and ethanolamine and thereafter washed with methanol.

16. The process of claim 1 wherein said coordination catalyst is formed from (a) a halide of an element of groups IVB, VB and VIB of the Periodic Table and (b) the alkali metals, the alkali metal hydrides, the alkali metal aluminum hydrides, the organometallic compounds of the alkali metals, the organometallic compounds of the alkaline earth metals, the organometallic compounds of aluminum, the organometallic compounds of magnesium and the organometallic compounds of zinc.

17. The process of claim 1 wherein said coordination catalyst is formed by mixing (1) a compound selected from the group consisting of the alkyl aluminum mono- and di-chlorides and bromides having from about 2 to about 4 carbon atoms in the alkyl groups and the trialkyl aluminums having from about 2 to about 4 carbon atoms in the alkyl groups with (2) a salt selected from the group consisting of the chlorides, bromides and iodides of titanium, zirconium, hafnium, thorium, uranium, vanadium, columbium, tantalum, chromium, molybdenum and tungsten.

18. The process of claim 1 wherein said coordination catalyst is formed from diethyl aluminum chloride and aluminum-reduced and activated titanium tetrachloride.

19. The process of claim 1 wherein the polypropylene is treated under substantially anhydrous and anaerobic conditions.

References Cited by the Examiner

UNITED STATES PATENTS 2,988,543   6/61   Meyer et al. _____ 260—93.7

FOREIGN PATENTS 555,192   8/57   Belgium.

JOSEPH L. SCHOFER, Primary Examiner.

MORRIS LIEBMAN, WILLIAM H. SHORT, Examiners.